UNITED STATES PATENT OFFICE.

JOHN A. HENDERSON, OF LAWRENCE, KANSAS.

COATING FOR NAILS.

SPECIFICATION forming part of Letters Patent No. 686,654, dated November 12, 1901.

Application filed July 22, 1901. Serial No. 69,302. (No specimens.)

*To all whom it may concern:*

Be it known that I, JOHN A. HENDERSON, a citizen of the United States, residing at Lawrence, in the county of Douglas and State of Kansas, have invented a new and useful Composition for Coating Nails, of which the following is a specification.

My invention is an improved composition for coating metals to preserve the same from corrosion, and which is especially adapted for use in coating nails, both for the purpose of preserving the same against rust and for securing them firmly in wood when driven thereinto, the object of my invention being to provide an improved composition which is adapted to expand when heated, which is impervious to moisture, and which is adhesive, so that a nail coated therewith and driven into wood will be thereby cemented in the wood and prevented from working out under stress.

In making my improved composition I take of gum-arabic, one pound; rosin, (colophony,) ten pounds; linseed-oil, one pound. The same are heated and stirred until the gum-arabic and rosin are dissolved and the ingredients become thoroughly commingled.

Nails or other metallic objects should be coated with the composition while the same is hot, which may be done by dipping the nails into the heated composition, or where the objects to be coated are of considerable size the composition may be applied thereto with a brush.

When cold, my improved composition hardens and forms a coating which is impervious to moisture, is adapted to expand by heat without cracking, and is somewhat adhesive, so that when a nail coated with my improved composition is driven into wood the heat consequent upon the friction causes the composition to expand with the metal of which the nail is composed and causes the composition to become adhesive, so that the same materially assists in keeping the nail in place. Furthermore, the improved composition, forming, as it does, a coating for the nail, prevents the latter from rusting.

While my improved composition is especially adapted for use in coating nails, the same may be also used for coating screws and other metallic objects.

Having thus described my invention, I claim—

A composition consisting of gum-arabic, rosin and linseed-oil, substantially in the proportions of ten parts by weight of the rosin to one part each of the gum-arabic and linseed-oil, the said ingredients being mixed by stirring the same together when heated.

In testimony that I claim the foregoing as my own I have hereto affixed my signature in the presence of two witnesses.

JOHN A. HENDERSON.

Witnesses:
FRED BROOKS,
L. S. PEARCE.